United States Patent
Moriya (10) Patent No.: US 7,693,646 B2
(45) Date of Patent: Apr. 6, 2010

(54) INTERNAL COMBUSTION ENGINE CONTROL DEVICE AND METHOD

(75) Inventor: Hidenori Moriya, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 292 days.

(21) Appl. No.: 11/719,658

(22) PCT Filed: Nov. 18, 2005

(86) PCT No.: PCT/JP2005/021632

§ 371 (c)(1),
(2), (4) Date: May 18, 2007

(87) PCT Pub. No.: WO2006/054794

PCT Pub. Date: May 26, 2006

(65) Prior Publication Data

US 2008/0201056 A1    Aug. 21, 2008

(30) Foreign Application Priority Data

Nov. 18, 2004 (JP) .............................. 2004-334894

(51) Int. Cl.
*G06F 19/00* (2006.01)
*G06G 7/70* (2006.01)

(52) U.S. Cl. ...................... 701/111; 701/104; 123/435

(58) Field of Classification Search ................. 123/295, 123/299, 300, 305, 430, 435; 701/101, 102, 701/103, 104, 111

See application file for complete search history.

(56) References Cited

U.S. PATENT DOCUMENTS

| 7,367,318 | B2 * | 5/2008 | Moriya et al. ............... 123/435 |
| 2004/0139949 | A1 * | 7/2004 | Koseki et al. .......... 123/568.14 |
| 2004/0231640 | A1 * | 11/2004 | Iwasaki et al. .............. 123/396 |
| 2008/0319633 | A1 * | 12/2008 | Moriya et al. ............... 701/103 |

FOREIGN PATENT DOCUMENTS

| EP | 0 527 659 A2 | 2/1993 |
| EP | 0 684 374 A2 | 11/1995 |

(Continued)

OTHER PUBLICATIONS

English Translastion of JP 62-228642.*

*Primary Examiner*—Stephen K Cronin
*Assistant Examiner*—Anthony L Bacon
(74) *Attorney, Agent, or Firm*—Oblon, Spivak, McClelland, Maier & Neustadt, L.L.P.

(57) ABSTRACT

An ECU of an internal combustion engine estimates an anticipated air amount in response to a demand for the internal combustion engine and causes an injector to inject an initial amount of fuel determined in accordance with the anticipated air amount so that an air-fuel ratio of a mixture in a combustion chamber is lower than a target value, and thereafter, calculates an amount of intake air aspired into the combustion chamber based on an in-cylinder pressure in the combustion chamber at a given timing during a compression stroke and before ignition, and causes the injector to inject a correction amount of fuel determined based on the calculated amount of the intake air and the initial amount of the fuel so that the air-fuel ratio of the mixture in the combustion chamber corresponds to the target value.

12 Claims, 5 Drawing Sheets

FOREIGN PATENT DOCUMENTS

| | | |
|---|---|---|
| JP | 62 228642 | 10/1987 |
| JP | 1 285640 | 11/1989 |
| JP | 9 158762 | 6/1997 |
| JP | 2002 4928 | 1/2002 |
| JP | 2002 54467 | 2/2002 |
| JP | 2002 180892 | 6/2002 |
| JP | 2004 11617 | 1/2004 |
| JP | 2004 108262 | 4/2004 |

* cited by examiner

INTERNAL COMBUSTION ENGINE CONTROL DEVICE AND METHOD

TECHNICAL FIELD

The present invention relates to a device and method for controlling an internal combustion engine, which generates engine power by burning a mixture of fuel and air inside a combustion chamber.

BACKGROUND ART

Conventionally, as a method for injecting fuel into an internal combustion engine, there is known a method which predicts an amount of fuel to be supplied into a combustion chamber, supplies the predicted amount of the fuel to a combustion chamber, thereafter re-predicts an amount of fuel to be supplied into the combustion chamber prior to the closing of an intake valve for determining a shortage amount of fuel, and re-supplies the determined shortage amount into the combustion chamber (e.g. refer to Japanese Patent Laid-Open No. 1-285640). According to this method, the amount of the fuel to be supplied into the combustion chamber is predicted using an intake pipe pressure and an engine rotational speed calculated from various kinds of parameters.

As in the case of the aforementioned conventional example, however, even if the intake pipe pressure and the engine rotational speed calculated from various kinds of parameters are used, it is difficult to accurately predict the amount of fuel to be supplied into the combustion chamber. For this reason, the method according to the conventional example has a disadvantage in that an air-fuel ratio of the mixture in the combustion chamber may deviate from a target value thereof.

To this end, an object of the present invention is to provide a device and method for controlling an internal combustion engine, which is capable of accurately obtaining an amount of required fuel and suitably approximating an air-fuel ratio in a combustion chamber toward a target value.

DISCLOSURE OF THE INVENTION

In a control device for an internal combustion engine of the present invention, a control device of an internal combustion engine includes an injector for supplying fuel into a combustion chamber and a valve-actuating mechanism capable of changing an opening characteristic of at least one of intake and exhaust valves, and generates engine power by burning a mixture of fuel and air in the combustion chamber comprising: in-cylinder pressure detection means for detecting an in-cylinder pressure in the combustion chamber; anticipated air amount estimation means for estimating an anticipated air amount in response to a demand for the internal combustion engine; intake air calculation means for calculating an amount of air aspired into the combustion chamber based on the in-cylinder pressure detected by the in-cylinder pressure detection means at a given timing during a compression stroke and before combustion start, a pressure of intake air during a valve overlapping of the intake and exhaust valves and a pressure of exhaust gas during the valve overlapping; and fuel injection control means for injecting from the injector an initial amount of fuel determined so that the air-fuel ratio of the mixture in the combustion chamber is higher than a target value in accordance with the anticipated air amount estimated by the anticipated air amount estimation means and also injecting from the injector a correction amount of fuel determined based on the initial amount of the fuel and the amount of the air calculated by the intake air calculation means so that the air-fuel ratio of the mixture in the combustion chamber corresponds to the target value, wherein the pressure of the exhaust gas during the valve overlapping is estimated based on the in-cylinder pressure detected by the in-cylinder pressure detection means before or at start of the valve overlapping.

Another aspect of the present invention is a control device of an internal combustion engine having an injector for supplying fuel into a combustion chamber and a valve-actuating mechanism capable of changing an opening characteristic of at least one of intake and exhaust valves, and generating power by burning a mixture of fuel and air in the combustion chamber, comprising: in-cylinder pressure detection means for detecting an in-cylinder pressure in the combustion chamber; anticipated air amount estimation means for estimating an anticipated air amount in response to a demand for the internal combustion engine; intake air calculation means for calculating an amount of air aspired into the combustion chamber based on the in-cylinder pressure detected by the in-cylinder pressure detection means at given timing during a compression stroke and before combustion start, a pressure of intake air during a valve overlapping of the intake and exhaust valves and a pressure of exhaust gas during the valve overlapping; and fuel injection control means for causing the injector to inject an initial amount of fuel determined so that the air-fuel ratio of the mixture in the combustion chamber is higher than a target value in accordance with the anticipated air amount estimated by the anticipated air amount estimation means and also causing the injector to inject a correction amount of fuel determined based on the initial amount of fuel and the amount of air calculated by the intake air calculation means so that the air-fuel ratio of the mixture in the combustion chamber corresponds to the target value, wherein: the in-cylinder pressure is used instead of the pressure of the exhaust gas during the valve overlapping until a ratio between the pressure of the intake air during the valve overlapping and the in-cylinder pressure detected before or at start of the valve overlapping exceeds a given value; and on the other hand, when the ratio between the pressure of the intake air during the valve overlapping and the in-cylinder pressure detected before or at start of the valve overlapping exceeds the given value, the pressure of the exhaust gas during the valve overlapping is determined based on the pressure of the intake air during the valve overlapping and the given value.

According to a control method for internal engine of the present invention, a control method of an internal combustion engine includes an injector for supplying fuel into a combustion chamber and a valve-actuating mechanism capable of changing an opening characteristic of at least one of intake and exhaust valves, and generates engine power by burning a mixture of fuel and air in the combustion chamber comprising: (a) a step of estimating an anticipated air amount in response to the demand for the internal combustion engine; (b) a step of injecting from the injector the initial amount of fuel predetermined so that an air-fuel ratio of the mixture in the combustion chamber is higher than a target value in accordance with the anticipated air amount; (c) a step of calculating an amount of air aspired into the combustion chamber based on an in-cylinder pressure in the combustion chamber at a given timing during a compression stroke and before combustion start, a pressure of intake air during a valve overlapping of the intake and exhaust valves, and a pressure of exhaust gas during the valve overlapping estimated based on in-cylinder pressure detected before or at start of the valve overlapping; and (d) a step of injecting from the injector a correction amount of fuel determined based on the initial amount of the fuel and the amount of the air calculated at the step (c) so that the air-fuel ratio of the mixture in the combustion chamber corresponds to the target value.

Still another aspect of the present invention is a control method of an internal combustion engine having an injector for supplying fuel into a combustion chamber and a valve-actuating mechanism capable of changing an opening characteristic of at least one of intake and exhaust valves, and generating power by burning a mixture of fuel and air in the combustion chamber, comprising: (a) estimating an anticipated air amount in response to a demand for the internal combustion engine; (b) causing the injector to inject an initial amount of fuel determined so that an air-fuel ratio of the mixture in the combustion chamber is higher than a target value in accordance with the anticipated air amount; (c) calculating an amount of air aspired into the combustion chamber based on an in-cylinder pressure in the combustion chamber at given timing during a compression stroke and before combustion start, a pressure of intake air during a valve overlapping of the intake and exhaust valves, and a pressure of exhaust gas during the valve overlapping; and (d) causing the injector to inject a correction amount of fuel determined based on the initial amount of fuel and the amount of the air calculated at the step (c) so that the air-fuel ratio of the mixture in the combustion chamber corresponds to the target value, wherein: the in-cylinder pressure is used instead of the pressure of the exhaust gas during the valve overlapping until a ratio between the pressure of the intake air during the valve overlapping and the in-cylinder pressure detected before or at start of the valve overlapping exceeds a given value; and on the other hand, when the ratio between the pressure of the intake air during the valve overlapping and the in-cylinder pressure detected before or at start of the valve overlapping exceeds the given value, the pressure of the exhaust gas during the valve overlapping is determined based on the pressure of the intake air during the valve overlapping and the given value.

BEST MODE FOR CARRYING OUT THE INVENTION

In an internal combustion engine to which a control device according to the present invention is applied, an anticipated air amount in response to a demand for the internal combustion engine is estimated by anticipated air amount estimation means, for example, at a given timing before an intake valve opens. When the anticipated air amount is estimated, fuel injection control means causes an injector to inject an initial amount of fuel determined so that an air-fuel ratio of a mixture in the combustion chamber is higher than a target value in accordance with the anticipated amount of the air. Then, intake air amount calculation means calculates an amount of air aspired into the combustion chamber based on an in-cylinder pressure in the combustion chamber at the given timing during the compression stroke and before combustion start, a pressure of intake air during a valve overlapping of the intake and exhaust valves and a pressure of exhaust gas during the valve overlapping. In addition, when the amount of the intake air is calculated, the fuel injection control means causes the injector to inject the correction amount of the fuel determined based on the amount of the intake air and the initial amount of the fuel so that the air-fuel ratio of the mixture in the combustion chamber corresponds to the target value. The pressure of the exhaust gas during the valve overlapping is estimated based on the in-cylinder pressure detected by the in-cylinder pressure detection means before or at start of the valve overlapping.

Thus, in the control device, the amount of the intake air aspired into the combustion chamber is calculated based on the in-cylinder pressure in the combustion chamber at the given timing during the compression stroke and before the combustion start. Herein, the in-cylinder pressure during the compression stroke exhibits a relatively high value and is accurately detected independently of the detection accuracy of the in-cylinder pressure detection means (an in-cylinder pressure sensor), the resolution of in-cylinder pressure data thereof or the like. For this reason, use of the in-cylinder pressure in the combustion chamber at the given timing during the compression stroke and before the combustion start enables the amount of the intake air aspired into the combustion chamber to be accurately obtained. Accordingly, by determining the correction amount of the fuel, namely the shortage amount of the fuel to the originally required amount of fuel using the initial amount of fuel determined in accordance with the anticipated air amount and the calculated amount of the intake air, the sum of the initial amount of the fuel and the correction amount of the fuel can be suitably approximated to the fuel injection amount theoretically determined in accordance with the demand for the internal combustion engine and the target air-fuel ratio.

In addition, since the initial amount of the fuel is determined so that the air-fuel ratio of the mixture in the combustion chamber is higher than the target value, no excessive amount of the fuel exists in the combustion chamber when the initial amount of the fuel is supplied into the combustion chamber and the fuel is to be introduced into the combustion chamber in amount corresponding to the target air-fuel ratio when the correction amount of the fuel is supplied into the combustion chamber. Thus, according to the control device for the internal combustion engine of the present invention, the requested amount of the fuel can be accurately obtained and the air-fuel ratio of the mixture in the combustion chamber can be suitably approximated to the target value.

In this case, preferably, the injector is an injector for in-cylinder injection, which injects the fuel directly into the inside of the combustion chamber, wherein the initial amount of the fuel is greater than the correction amount of the fuel, the initial amount of the fuel is injected into the combustion chamber by the injector during an intake stroke and the correction amount of the fuel is injected into the combustion chamber by the injector during the compression stroke.

By thus decreasing the amount of the fuel to be injected into the combustion chamber during the compression stroke, any increase in cost associated with the application of high-pressure injection can be suppressed.

Preferably, the internal combustion engine includes a valve operating mechanism capable of changing the valve opening characteristic of at least one of intake and exhaust valves. Preferably the control device in the present invention further comprises in-cylinder pressure variation amount calculation means of calculating a variation amount in an in-cylinder pressure due to valve overlapping between the intake valve and the exhaust valve, wherein the intake air calculation means calculates the amount of the intake air aspired into the combustion chamber based on the in-cylinder pressure detected by the in-cylinder pressure detection means at a given timing during the compression stroke and before the combustion start and the variation amount of the in-cylinder pressure calculated by the in-cylinder pressure variation amount calculation means.

When the intake valve and the exhaust valve are set to overlap each other, an amount of a residual gas Me remaining in the combustion chamber due to the valve overlap is expressed by the following formula (1), assuming that the pressure of the intake air at a given timing during the valve overlapping (timing when a crank angle becomes $\theta1$) is Pm ($\theta1$) and the pressure of the exhaust gas at the given timing is Pe ($\theta1$), the temperature of the exhaust gas is Te at the given timing, and a gas constant is R(J/(kg·K)).

$$Me = S \cdot \phi(Pm(\theta_1)/Pe(\theta_1)) \cdot Pe(\theta_1)/\sqrt{R \cdot Te} \quad (1)$$

In the above formula (1), S is an effective gas-passage area which is the effective area allowing gas passing during the valve overlapping. The effective gas-passage area S is expressed by the following formula (2). In the formula (2), Ne ($\theta1$) is an engine rotational speed at a timing when the crank angle becomes $\theta1$. Ri is a diameter of the intake valve Vi, Re is a diameter of the exhaust valve Ve, Li ($\theta$) is a lift amount of the intake valve Vi, Le($\theta$) is a lift amount of the exhaust valve Ve, IVO is a crank angle at a timing when the intake valve Vi opens, and EVC is a crank angle at a timing when the exhaust valve Ve closes. Furthermore, in the formula (2), a value ($\int \sqrt{(Li(\theta) \cdot Le(\theta))} d\theta$) obtained by integrating $\sqrt{(Li(\theta) \cdot Le(\theta))}$ from IVO to EVC is determined in accordance with an advance amount (VVT advance amount) of a variable valve timing mechanism.

In the above expression (1), $\phi(Pm(\theta1)/Pe(\theta1))$ is a term relating to a ratio between the intake air pressure and the exhaust gas pressure, which is primarily expressed by the following formula (3) and expressed by the following formula (4) when the value for Pm($\theta1$)/Pe($\theta1$) is small. It should be noted that $\kappa$ is a ratio of specific heat in the formulae (3) and (4).

$$S = \pi \cdot \sqrt{Ri \cdot Re} \cdot \cos(45°) \cdot \int_{IVO}^{EVC} \sqrt{Li(\theta) \cdot Le(\theta)} \, d\theta \cdot (60/Ne(\theta_1)/360) \quad (2)$$

$$\text{When } \frac{Pm(\theta_1)}{Pe(\theta_1)} \geq \left(\frac{2}{\kappa+1}\right)^{\frac{\kappa}{\kappa-1}}, \quad (3)$$

$$\phi\left(\frac{Pm(\theta_1)}{Pe(\theta_1)}\right) = \sqrt{\frac{2\kappa}{\kappa-1} \cdot \left\{\frac{Pm(\theta_1)}{Pe(\theta_1)}\right\}^{\frac{2}{\kappa}} - \left\{\frac{Pm(\theta_1)}{Pe(\theta_1)}\right\}^{\frac{\kappa+1}{\kappa}}}$$

$$\text{When } \frac{Pm(\theta_1)}{Pe(\theta_1)} < \left(\frac{2}{\kappa+1}\right)^{\frac{\kappa}{\kappa-1}}, \phi\left(\frac{Pm(\theta_1)}{Pe(\theta_1)}\right) = \sqrt{\kappa \cdot \left(\frac{2}{\kappa+1}\right)^{\frac{\kappa+1}{\kappa-1}}} \quad (4)$$

On the other hand, the experimental result has demonstrated that the relationship shown in the following formula (5) is established between the amount of the residual gas Me remaining in the combustion chamber due to the valve overlapping and a variation amount of the in-cylinder pressure $\Delta Pc$ due to the valve overlapping. Accordingly, from the above formulas (1) and (5), the variation amount of the in-cylinder pressure $\Delta Pc$ is expressed by the following formula (6) based upon the amount of the residual gas Me remaining in the combustion chamber due to the valve overlapping. In the formula (6), $\alpha$ is a constant determined based on experimental results or the like. From the variation amount of the in-cylinder pressure $\Delta Pc$ and the in-cylinder pressure Pc ($\theta2$) detected by the in-cylinder pressure detection means at a given timing (timing when the crank angle becomes $\theta2$) during the compression stroke (after the intake valve closes) and before the combustion start (before spark ignition or compression ignition), the amount of air $M_{air}$ aspired into the combustion chamber is expressed by the following formula (7). It should be noted that $\beta$ is a constant determined based on experiment results or the like in the formula (7).

$$\Delta Pc \propto Me \cdot \sqrt{Te} \quad (5)$$

$$\Delta Pc = \alpha \cdot S \cdot \phi(Pm(\theta_1)/Pe(\theta_1)) \cdot Pe(\theta_1) \quad (6)$$

$$M_{air} = \beta \cdot (Pc(\theta_2) - \Delta Pc) \quad (7)$$

Accordingly, as executed in the internal combustion engine of the present invention, by obtaining the pressure of the intake air Pm($\theta1$) at a given timing during the valve overlapping, the pressure of the exhaust gas Pe($\theta1$) and the engine rotational speed Ne($\theta1$), as well as the in-cylinder pressure Pc($\theta2$) detected at a given timing during the compression stroke and before the combustion start, the amount of the intake air aspired into the combustion chamber can be accurately calculated at a low cost without using many sensors.

As mentioned above, it is preferable that when the variation amount in the in-cylinder pressure $\Delta Pc$ generated due to the valve overlapping is calculated based on the pressure of the intake air Pm($\theta1$) and the pressure of the exhaust gas Pe($\theta1$) during the valve overlapping, the pressure of the exhaust gas Pe($\theta1$) is estimated based on the in-cylinder pressure Pc($\theta0$) detected by the in-cylinder pressure detection means immediately before, or at the start of valve overlapping (at timing when the crank angle becomes $\theta0$).

That is, the pressure of the exhaust gas before or at opening the intake valve for valve overlapping is generally equal to the in-cylinder pressure, and when a load in the internal combustion engine is not so high, a variation in pressure of the exhaust gas before and after the intake valve opens for valve overlap is small. For this reason, the pressure of the exhaust gas Pe($\theta1$) during the valve overlapping can be estimated based on the in-cylinder pressure Pc($\theta0$) detected by the in-cylinder pressure detection means before or at the beginning of the valve overlapping and when the load in the internal combustion engine is low, the relationship Pe($\theta1$)=Pc($\theta0$), for example, can be established. This eliminates the need for sensors for detecting the pressure of the exhaust gas, thus reducing the cost necessary for calculating the amount of the intake air aspired into the combustion chamber.

On the other hand, when the load in the internal combustion engine increases to a certain degree, the variation in pressure of the exhaust gas increases due to the influence of exhaust fluctuations or the like, making it difficult to use the in-cylinder pressure $Pc(\theta 0)$ detected by the in-cylinder pressure detection means before or at the start of valve overlapping start instead of the pressure of the exhaust gas $Pe(\theta 1)$ during the valve overlapping.

That is, a ratio between the pressure of the intake air aspired $Pm(\theta 1)$ during the valve overlapping, which is substituted for a function $\phi$ in the above formula (3), and the pressure of the exhaust gas $Pe(\theta 1)$ is generally equal to a ratio between the pressure of the intake air $Pm(\theta 1)$ aspired during the valve overlapping and the in-cylinder pressure $Pc(\theta 0)$ detected before or at the start of the valve overlapping and the values for both ratios increase as the load becomes higher. In contrast, if the ratio of the pressure of the intake air $Pm(\theta 1)$ aspired and the in-cylinder pressure $Pc(\theta 0)$ exceeds a given value $\epsilon$ experimentally and empirically predetermined, correlation of $Pm(\theta 1)/Pe(\theta 1)=Pm(\theta 1)/Pc(\theta 0)$ is not established.

To avoid this problem, it is preferable that when the ratio between the pressure of the exhaust gas $Pm(\theta 1)$ and the in-cylinder pressure $Pc(\theta 0)$ exceeds the given value $\epsilon$, the pressure of the exhaust gas during the valve overlapping $Pe(\theta 1)$ is defined as $Pe(\theta 1)=Pm(\theta 1)/\epsilon$ based on the pressure of the exhaust gas $Pm(\theta 1)$ during the valve overlapping and the above given value $\epsilon$, assuming that the ratio between the pressure of the exhaust gas $Pm(\theta 1)$ and the in-cylinder pressure during the valve overlapping $Pe(\theta 1)$ is fixed to the value $\epsilon$. This enables the amount of the intake air aspired into the combustion chamber to be accurately calculated with no influence by the variation in pressure of the exhaust gas associated with the valve overlap even if the load in the internal combustion engine becomes higher when the pressure of the exhaust gas is not actually measured during the valve overlapping.

It is also preferable that in the internal combustion engine having a plurality of combustion chambers, in-cylinder pressure detection means is disposed for each of the combustion chambers. It is preferable that in this case, the variation amount in pressure of the in-cylinder pressure $\Delta Pc$ is calculated for each of the combustion chambers and the amount of the intake air aspired into each of the combustion chambers is calculated based on the variation amount in pressure of the in-cylinder pressure $\Delta Pc$ for each of the combustion chambers and the in-cylinder pressure $Pc(\theta 2)$ in each of the combustion chambers detected by each of the in-cylinder pressure detection means at a given timing during the compression stroke and before the combustion start. This achieves highly accurate detection of the variations in pressure of the intake air aspired between the combustion chambers, thus improving the accuracy in controlling the air-fuel ratio or the like in each of the combustion chambers.

In addition, the pressure of the intake air during the valve overlapping in any of the combustion chambers may be estimated based on the in-cylinder pressure at a bottom dead center during an intake stroke in another combustion chamber in which an intake stroke is performed prior to that of the corresponding combustion chamber.

Generally, a pressure of the intake air and an in-cylinder pressure are substantially equal to each other at the bottom dead center during the intake stroke. In addition, the timing when the valve overlapping is performed in a combustion chamber is substantially equal to the timing when the bottom dead center during the intake stroke comes in the combustion chamber, in which the intake stroke is performed by 1/N cycle (herein, one cycle is composed of four strokes of intake, compression, expansion, and exhaust, and N is the number of cylinder engines) earlier than that of the corresponding combustion chamber. Accordingly, in consideration of these conditions, the pressure of the intake air is estimated based on the in-cylinder pressure. In consequence, a sensor for detecting the pressure of the intake pressure is unnecessary and therefore, the cost necessary for calculating the amount of the air aspired into each of the combustion chambers can be further reduced.

Now, by referring to the accompanying drawings, the best modes for carrying out the present invention will be specifically described.

Figure 1:
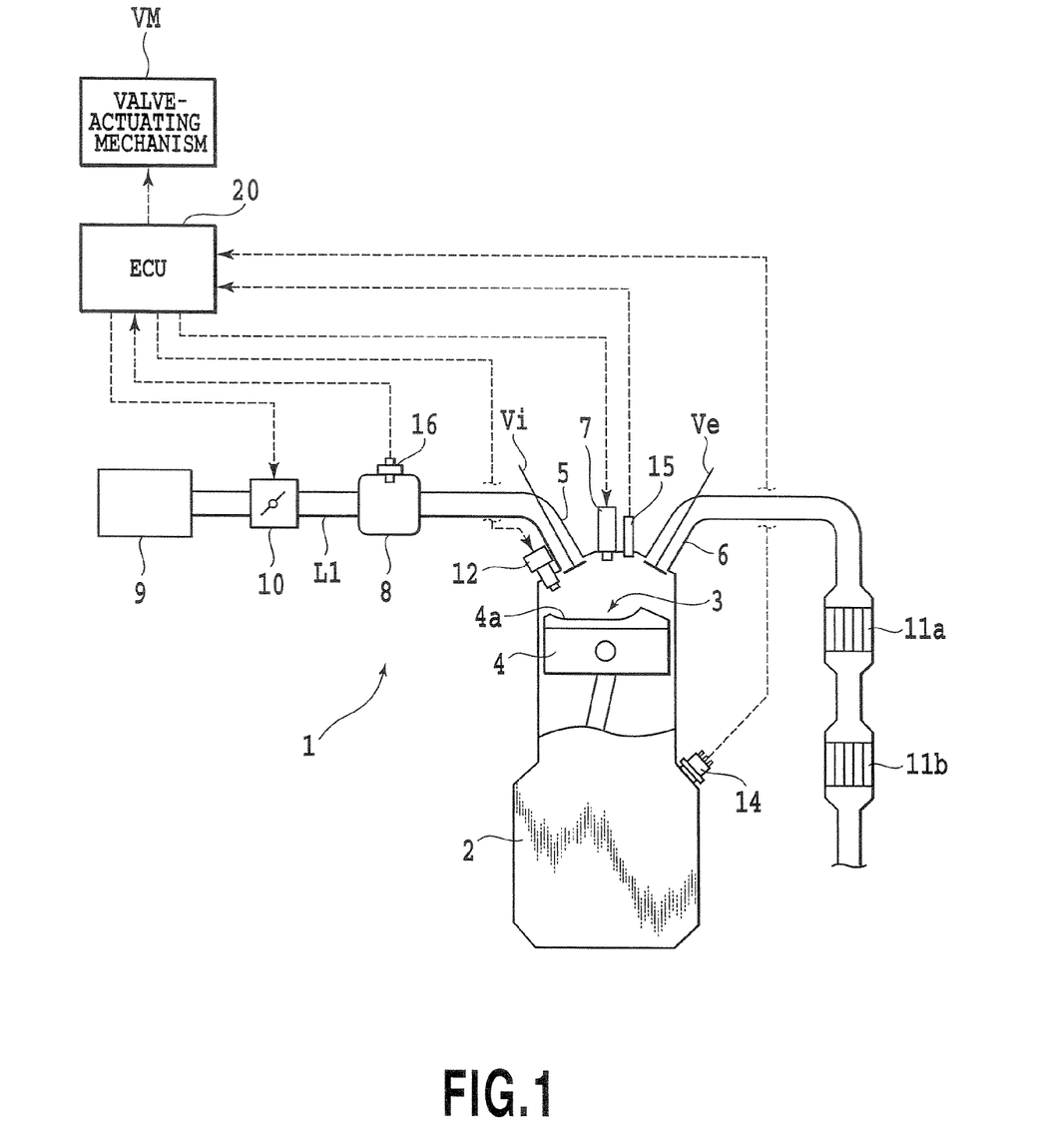
FIG. 1 is a schematic construction diagram showing an internal combustion engine to which the control device according to the present invention is applied.

FIG. 1 is a schematic construction view showing an internal combustion engine to which a control device of the present invention is applied. An internal combustion engine 1 shown in the figure generates engine power by burning a mixture of fuel and air inside a combustion chamber 3 formed in a cylinder block 2 to reciprocate a piston 4 in the combustion chamber 3. The internal combustion engine 1 is preferably configured as a multi-cylinder engine and for example, the internal combustion engine 1 according to the embodiment is configured as a four-cylinder engine.

An intake port in each of the combustion chambers 3 is connected to an intake pipe (intake manifold) 5 and an exhaust port in each of the combustion chambers 3 is connected to an exhaust pipe (exhaust manifold) 6. A cylinder head of the internal combustion engine 1 has an intake valve Vi and an exhaust valve Ve disposed for each of the combustion chambers 3. Each of the individual intake valves Vi opens and closes its associated intake port and each of the individual exhaust valves Ve opens and closes its associated exhaust port. The intake valve Vi and the exhaust valve Ve are opened and closed by a valve-actuating mechanism including a variable valve-timing mechanism. The internal combustion engine 1 further has ignition plugs 7 the number of which corresponds to the number of cylinders and the ignition plug 7 is disposed at the cylinder head so as to be exposed to the associated combustion chamber 3.

The intake pipe 5 is connected to a surge tank 8 as shown in FIG. 1. An air supply line L1 is connected to the surge tank 8. The intake line L1 is connected to an air inlet (not shown) through an air cleaner 9. A throttle valve (in this embodiment an electronically controlled throttle valve) 10 is incorporated in the halfway of the air supply line L1 (between the surge tank 8 and the air cleaner 9). On the other hand, as shown in FIG. 1, for example, a pre-catalysis device 11a including a three-way catalyst and for example, a post-catalysis device 11b including Nox absorption reduction catalyst are connected to the exhaust pipe 6.

Furthermore, the internal combustion engine 1 has a plurality of injectors 12 each of which, as shown in FIG. 1, is disposed at the cylinder head so as to be exposed to an inside of the associated combustion chamber 3. Each of the pistons 4 of the internal combustion engine 1 is constructed in a so-called deep-dish top shape and the upper face is provided with a recess 4a. In the internal combustion engine 1, with intake air aspired into the combustion chambers 3, each of the injectors 12 inject fuel such as gasoline directly toward the recess 4a of the piston 4 in each of the combustion chambers 3. Accordingly, in the internal combustion engine 1, a layer of the mixture of fuel and air being separated from its surrounding air layer is formed (stratified) in the vicinity of the ignition plug 7, enabling stable stratified combustion to be performed even using an extremely lean mixture.

The aforementioned each ignition plug 7, the throttle valves 10, each of injectors 12, the valve-actuating mechanism VM, and the like are electrically connected to the ECU20, which serves as a control device for the internal combustion engine 1. The ECU20 includes a CPU, a ROM, a RAM, I/O ports, a memory, and the like, all of which are not shown in the figure. To the ECU20, as shown in the FIG. 1, various sensors including a crank angle sensor 14 are electrically connected. The ECU20 controls the ignition plug 7, the throttle valve 10, the injector 12, the valve-actuating mechanism VM, and the like, by using various maps stored in the memory and the like, as well as based on a value detected by each of the sensors and the like so as to produce a desired output.

The internal combustion engine 1 has in-cylinder pressure sensors 15 (in-cylinder pressure detection means) including a semiconductor, a piezoelectric element, a magnetostriction element, or a fiber optical detection element. The number of the in-cylinder pressure sensors 15 corresponds to the number of the cylinders. Each of the in-cylinder pressure sensors 15 is disposed at the cylinder head with its pressure-receiving face being exposed to the inside of the associated combustion chamber 3 and is electrically connected to the ECU20 through an A/D converter or the like not shown in the figure. Each of the in-cylinder pressure sensors 15 outputs the pressure (in-cylinder pressure) applied on its pressure-receiving face in the combustion chamber 3 as a value relative to an atmospheric pressure and supplies an electric signal (a signal indicating a detected value) corresponding to the pressure applied to its pressure-receiving face to the ECU20.

Furthermore, the internal combustion engine 1 has an intake pressure sensor 16 for detecting a pressure (intake pressure) of the intake air in the surge tank 8 as an absolute pressure. The intake sensor 16 is also electrically connected to the ECU20 through an A/D converter (not shown) and the like to supply a signal indicating the detected absolute pressure of the intake air in the surge tank 8 to the ECU 20. It should be noted that the values detected by the crank-angle sensor 14 and intake sensor 16 are sequentially to the ECU20 at every minute time and stored and retained in the given memory region (buffer) of the ECU20 by a given amount.

Figure 2:
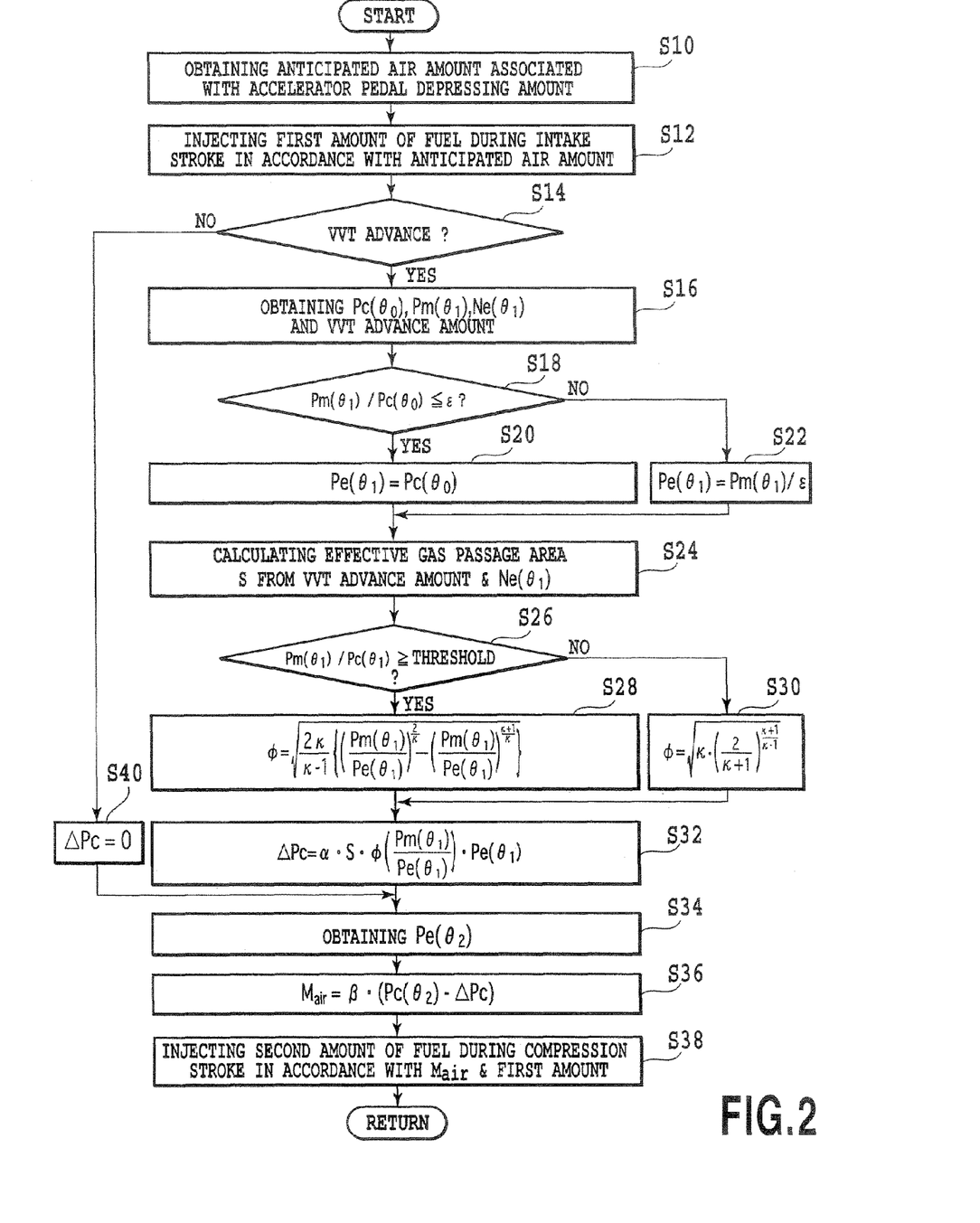
FIG. 2 is a flowchart illustrating a routine for setting an amount of fuel injected into the internal combustion engine shown in FIG. 1.

Next, referring to FIG. 2, a procedure for setting the fuel injection amount in the internal combustion engine 1 is described. When the internal combustion engine 1 is activated, a fuel injection setting routine shown in FIG. 2 is repeatedly executed by the ECU20 for each of the combustion chambers 3. At given timing when the intake valve Vi is opened in one combustion chamber 3 (any object combustion chamber), the ECU20 determines target torque in accordance with a depressing amount of an accelerator pedal (operating amount) based on a signal from an accelerator pedal position sensor (not shown), while obtaining (estimating) an anticipated amount of air, which is a predicted value for the amount of the intake air aspired into the combustion chamber 3 in accordance with the target torque by referring to a predetermined map and the like (S10).

Moreover, The ECU20 obtains a target air-fuel ratio determined in accordance with operating conditions at step S12 and determines an amount (initial injection amount) of fuel to be injected (fi) from each of the injectors 12 in accordance with the anticipated amount of the air obtained at step S10 so that an air-fuel ratio of the mixture in the combustion chamber is higher than its target value. In this embodiment, the initial amount of the fuel fi is, for example, 80% of the amount determined based on the anticipated amount of the air and the target air-fuel ratio. At a given timing during the intake stroke after the intake valve Vi has opened, the ECU20 opens the injector 12 so as to inject the initial amount fi of the fuel from the injector 12 disposed in the object combustion chamber 3 (S12). It should be noted that in this embodiment, the air-fuel ratio of the mixture in each of the combustion chambers 3 is basically kept approximately at a theoretical air-fuel ratio by the ECU20 with the target air-fuel ratio set to approximately 14.7. After step S12 is completed, the ECU20 determines whether or not the opening timing of the intake valve Vi is advanced (S14).

If it is determined that the valve-opening timing for the intake valve Vi is advanced at step S14, the ECU20 reads out an in-cylinder pressure $Pc(\theta 0)$ detected by the in-cylinder pressure sensor 15 at a given timing (timing when the crank angle becomes $\theta 0$) immediately before or at start of the valve overlapping of the intake valve Vi and the exhaust valve Ve with regard to the object combustion chamber 3 from a given memory region, and then reads out a pressure of the intake air $Pm(\theta 1)$ detected by the intake pressure sensor 16 at a given timing (timing when the crank angle becomes $\theta 1$) during the valve overlapping of the intake valve Vi and the exhaust valve Ve (S16). In addition, at step S16, the ECU20 obtains an engine rotational speed $Ne$ ($\theta 1$) at the given timing when the crank angle becomes $\theta 1$ based upon the value detected by crank angle sensor 14 at the given timing during the valve overlapping (timing when the crank angle becomes $\theta 1$) and also obtains an amount of a VVT advance amount at the timing when the crank angle becomes $\theta 1$ from the valve-actuating mechanism VM.

In this embodiment, the given timing immediately before the valve overlapping or at the start of valve overlapping is assumed to be the point at which the valve overlapping starts or the intake valve Vi opens, namely the point at which the crank angle becomes, for example, $\theta 0=20°$ before the top dead center. The given timing during the valve overlapping is the point when the crank angle comes to, for example, $\theta 1=10°$ before the top dead center (10° before exhaust top dead center). At step S20, when an in-cylinder pressure $Pc(\theta 0)$ at the timing when the crank angle becomes $\theta 0$ and a pressure of the intake air $Pm(\theta 1)$ at the timing when the crank angle becomes $\theta 1$ are obtained, the ECU20 determines a value $Pm(\theta 1)/Pc(\theta 0)$, which is a ratio between the pressure of the intake air $Pc(\theta 1)$ and the in-cylinder pressure $Pc(\theta 0)$ for the object combustion chamber 3 and also determines whether or not the value $Pm(\theta 1)/Pc(\theta 0)$ is below a given value $\epsilon$ (in this embodiment, $\epsilon=0.95$) (S18).

Figure 3:
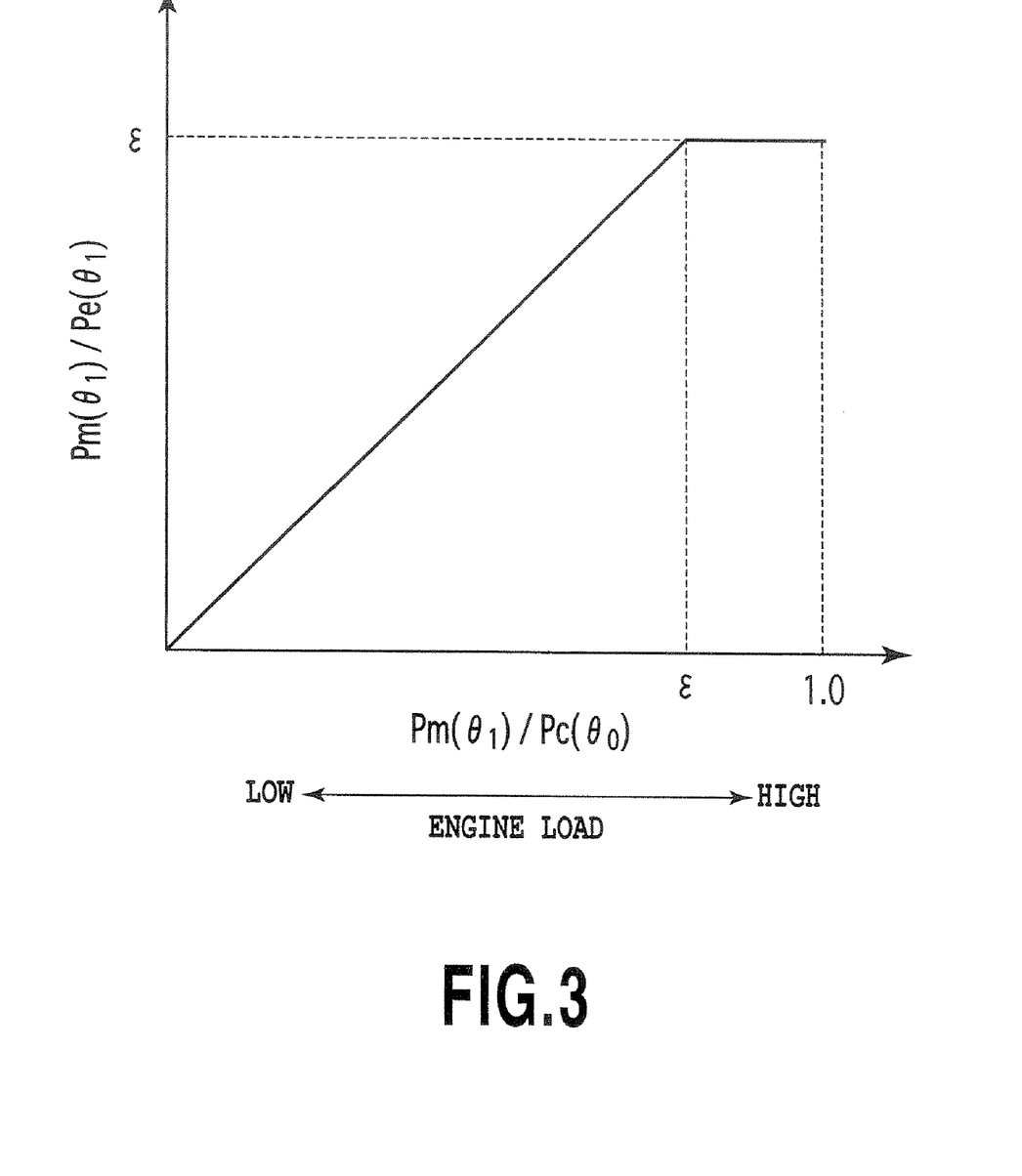
FIG. 3 is a graph exemplifying a relation between a ratio of a pressure of intake air at a given timing during a valve overlap stage to an in-cylinder pressure at a given timing immediately before the valve overlap stage or at start thereof and a ratio of a pressure of intake air to a pressure of an exhaust gas at a given timing during the valve overlap stage.

In this regard, a relationship as exemplified in FIG. 3 is established between $Pm(\theta 1)/Pc(\theta 0)$, which is a ratio between the pressure of the intake air $Pm(\theta 1)$ and the in-cylinder pressure $Pc(\theta 0)$ and $Pm(\theta 1)/Pe(\theta 1)$, which is a ratio between the pressure of the intake air $Pm(\theta 1)$ used as a parameter in the above formula (3) and the pressure of the exhaust gas $Pe(\theta 1)$. This means that in the range where the load in the internal combustion engine 1 is not so high, the values for $Pm(\theta 1)/Pe(\theta 1)$ and $Pm(\theta 1)/Pc(\theta 0)$ increase as the load becomes higher and a relationship $Pm(\theta 1)/Pe(\theta 1)=Pm(\theta 1)/Pc(\theta 0)$ is established.

The pressure of the exhaust gas is generally equal to the in-cylinder pressure at timing immediately before opening the intake valve Vi or at valve opening timing for the valve overlapping, and when the load in the internal combustion engine 1 is not so high, a variation in pressure of the exhaust gas is small between before and after the intake valve Vi is opened for valve overlapping. Accordingly, in the range where the load for the internal combustion engine 1 is not so high, the pressure of the exhaust gas $Pe(\theta 1)$ during the valve overlapping, i.e. at the timing when the crank angle becomes $\theta 1$, is estimated based on the in-cylinder pressure $Pc(\theta 0)$ detected by the in-cylinder pressure sensor 15 immediately before the valve overlapping or at the start of valve overlapping, that is, at the timing when the crank angle becomes $\theta 0$.

It can be assumed that the relationship of $Pe(\theta1)=Pc(\theta0)$ and $Pm(\theta1)/Pe(\theta1)=Pm(\theta1)/Pc(\theta0)$ is established.

Contrarily, as the load for the internal combustion engine 1 becomes higher to some degree, the variation in pressure of the exhaust gas increases due to the influence of the exhaust fluctuations or the like before and after the intake valve Vi is opened for valve overlapping. That is, when the load for the internal engine 1 becomes high to some degree and the ratio between $Pe(\theta1)/Pc(\theta0)$, which is the ratio between the pressure of the intake air $Pm(\theta1)$ and the in-cylinder pressure $Pc(\theta0)$ exceeds the given value $\epsilon$, the correlation $Pm(\theta1)/Pe(\theta1)=Pm(\theta1)/Pc(\theta0)$ is not established, making it difficult to use the in-cylinder pressure $Pc(\theta0)$ detected by the in-cylinder pressure detection means immediately before and at the start of the valve overlapping instead of the pressure of the exhaust $Pe(\theta1)$ during the valve overlapping.

In consideration of these conditions, in the internal combustion engine 1, when it is determined that the value for $Pm(\theta1)/Pc(\theta0)$ is lower than the above given value $\epsilon$ for the each combustion chamber 3 at step S18, the pressure of the exhaust gas $Pe(\theta1)$ during the valve overlapping is substituted by the in-cylinder pressure $Pc(\theta0)$ detected by the in-cylinder pressure sensor 15 immediately before or at start of the valve overlapping, and $Pe(\theta1)=Pc(\theta0)$ is set by the ECU20 (S20). When it is determined that the value for $Pm(\theta1)/Pc(\theta0)$ exceeds the above given value $\epsilon$ for the each combustion chamber 3 at step S18, the ECU 20 uses the above given value $\epsilon$ to set the pressure of the exhaust gas $Pe(\theta1)$ during the valve overlapping as $Pe(\theta1)=Pm(\theta1)/\epsilon$ (S22). This means that at step S22, assuming that the ratio between the pressure of the intake air $Pm(\theta1)$ during the valve overlapping and the pressure of the exhaust gas $Pe(\theta1)$ is fixed to the threshold $\epsilon$ (in this embodiment, $\epsilon$ is 0.95) as a guard value, the pressure of the exhaust gas $Pe(\theta1)$ during the valve overlapping is determined based on the pressure of the intake air $Pm(\theta1)$ during the valve overlapping and the threshold $\epsilon$.

When the processes in steps S20 and S22 are executed, the ECU20 uses a predetermined function formula or map to determine a value for $\int \sqrt{(Li(\theta) \cdot Le(\theta))} d\theta$ corresponding to an amount of a VVT advance obtained at S16 and uses this determined value and an engine rotational speed $Ne(\theta1)$ obtained at step 16 to calculate an effective gas-passage area S from the above formula (2)(S24). When the effective gas-passage area S is determined, the ECU20 determines whether or not a value obtained by dividing the pressure of the intake air $Pm(\theta1)$ obtained at the step S16 by the pressure of the exhaust gas $Pe(\theta1)$ during the valve overlapping, which is set at step S20 or S22, exceeds the threshold $(2/(\kappa+1))\kappa/(\kappa-1)$ (S26). In this embodiment, for example, a constant obtained when $\kappa=1.32$ is used for the threshold $(2/(\kappa+1))\kappa/(\kappa-1)$ (S26).

As mentioned above, the formula representing $\phi(Pm(\theta1)/Pe(\theta1))$ necessary for calculating the variation amount in in-cylinder pressure $\Delta Pc$ due to valve overlapping varies with the value for $Pm(\theta1)/Pe(\theta1)$. For this reason, when it is determined at step S26 that the value for $Pm(\theta1)/Pe(\theta1)$ is greater than the above given threshold, the ECU20 uses the above formula (3) to calculate the value for $\phi(Pm(\theta1)/Pe(\theta1))$ (S28). When it is determined at step S26 that the value for $Pm(\theta1)/Pe(\theta1)$ is lower than the above given threshold, the ECU20 uses the above formula (4) to calculate the value for $\phi(Pm(\theta1)/Pe(\theta1))$ (S30).

After obtaining the effective gas-passage area S at step S24 and the value for $\phi(Pm(\theta1)/Pe(\theta1))$ at step S28 or S30, the ECU20 uses the above formula (6) to calculate the variation amount in the in-cylinder pressure $\Delta Pc$ due to the valve overlapping for the object combustion chamber 3 (S32). After step S32 is executed, the ECU20 reads out the in-cylinder pressure $Pc(\theta2)$ detected by the in-cylinder pressure sensor 15 for the object combustion chamber 3 during the compression stroke and at the timing when the crank angle becomes $\theta2$ before ignition (S34). It should be noted that in this embodiment, the given timing during the compression stroke and before ignition is a point when, for example, the crank angle is defined as $\theta2=50°$ before the top dead center (50° before the compression top dead center).

The ECU20 uses the above formula (7) to calculate an amount of the intake air Mair for the object combustion chamber 3 from the variation amount in the in-cylinder pressure $\Delta Pc$ obtained at step S32 and the in-cylinder pressure $Pc(\theta2)$ obtained at step S34 (S36). Thus, in the internal combustion engine 1, by obtaining the pressure of the intake air $Pm(\theta1)$, the pressure of the exhaust gas $Pe(\theta1)$, and the engine rotational speed $Ne(\theta1)$ at a given timing during the valve overlapping, as well as the in-cylinder pressure $Pc(\theta2)$ detected at the given timing during the compression stroke and before ignition, an amount of the intake air aspired into each of the combustion chambers 3 can be accurately calculated without using many sensors even if the valve overlapping is set.

When the load is low in the internal combustion engine 1 and the value for $Pm(\theta1)/Pc(\theta0)$ is determined to be lower than the threshold $\epsilon$ at step S18, the in-cylinder pressure $Pc(\theta0)$ detected by the in-cylinder pressure sensor 15 immediately before or at start of the valve overlapping is substituted for the pressure of the exhaust gas $Pe(\theta1)$ during the valve overlapping. This eliminates the need for sensors for actually measuring the pressure of the exhaust gas, thus enabling the cost necessary for calculating the amount of the intake air aspired into each of the combustion chambers 3 to be reduced.

In addition, of the internal combustion engine 1 with no sensors for actually measuring the pressure of the exhaust gas, when it is determined that the load for the engine becomes higher and the value for $Pm(\theta1)/Pc(\theta0)$ exceeds the threshold $\epsilon$ at step S18, the ratio between the pressure of the intake air $Pm(\theta1)$ and the pressure of the exhaust gas $Pe(\theta1)$ during the valve overlapping is fixed to the threshold $\epsilon$ (in this embodiment, $\epsilon$ is 0.95) being a guard value, the pressure of the exhaust gas $Pe(\theta1)$ during the valve overlapping is determined based on the threshold $\epsilon$ (S22). Thus, since when the load for the internal combustion engine 1 becomes higher, a difference is small between the pressure of the intake air and the pressure of the exhaust gas, and the residual gas decreases. Therefore, even if the process like step S22 is executed, an amount of the intake air aspired into each of the combustion chambers 3 can be accurately calculated with no influence due to a variation in pressure of the exhaust gas, resulting in suitable results for practical use.

Furthermore, in the internal combustion engine 1 having a plurality of combustion chambers 3 and the cylinder sensor 15 disposed in each of the combustion chambers 3, the variation amount in the in-cylinder pressure $\Delta Pc$ is calculated for each of the combustion chambers 3, and the amount of the intake air aspired into each of the combustion chambers 3 is calculated based on the variation amount in the in-cylinder pressure $\Delta Pc$ in each of the combustion chambers 3 and the in-cylinder pressure $Pc(\theta2)$ detected by each of the in-cylinder pressure sensors 15. This enables the variations in amount of the intake air between the combustion chambers 3 to be accurately detected, improving the accuracy for the air-fuel ratio control or the like in each of the combustion chambers 3.

After the amount of the intake air Mair aspired into the object combustion chamber 3 is calculated at step S36, the ECU20 determines the correction amount of fuel fc based upon the amount of the intake air Mair and the initial injection amount fi determined in step S12 so that the air-fuel ratio of the mixture in the combustion chamber 3 corresponds to the target air-fuel ratio (theoretical air-fuel ratio) (S38). This means that at step S38, the ECU20 obtains the correction injection amount of fuel fc by subtracting the initial injection amount of fuel fi from the original amount of fuel determined from the amount of the intake air Mair and the target air-fuel ratio. The ECU20 opens the injector 12 disposed in the target combustion chamber 3 so as to inject the correction amount fc of fuel therefrom at a given timing during the compression stroke after the intake valve Vi has closed (S38).

Thus, by determining the correction amount of the fuel, namely the shortage amount of the fuel relative to the original amount of fuel using the initial amount of the fuel fi determined in accordance with the anticipated amount of the air and the calculation amount of the intake air Mair, the sum of the initial amount of the fuel fi and the correction amount of the fuel fc can be approximated suitably to the amount of injected fuel theoretically determined in accordance with the demand for the internal combustion engine 1 and the target air-fuel ratio. As mentioned above, since the air-fuel ratio of the mixture in the combustion chamber 3 is determined so that it is higher than its target value, an excessive amount of fuel is not left in the combustion chamber 3 at the point when the initial amount of the fuel fi is supplied into the combustion chamber 3, allowing the amount of fuel in accordance with the target air-fuel ratio to be introduced into the combustion chamber 3 at the point when the correction amount fc of the fuel is supplied into the combustion chamber 3. Accordingly, by executing the routine as shown in FIG. 2, the requested amount of the fuel can be accurately obtained so as to suitably approximate the air-fuel ratio to its target air-fuel ratio in the combustion chamber 3.

Furthermore, since the initial amount of the fuel fi, which is the amount of the fuel to be injected into the combustion chamber 3 during the intake stroke is, for example, 80% of the amount of the fuel determined based on the anticipated amount of the air and the target air-fuel ratio, it is greater than the correction amount of the fuel fi, which is the amount of the fuel injected into the combustion chamber 3 during the compression stroke. Accordingly, in the internal combustion engine 1, it is possible that the amount of the fuel to be injected into the combustion chamber 3 during the compression stroke is reduced to suppress an increase in cost for the execution of so-called high-pressure injection.

On the other hand, when it is determined that the valve opening timing for the intake valve Vi is not advanced and the valve overlapping of the intake valve Vi and the exhaust valve Ve is not set at step S18, the ECU20 sets the variation amount in the in-cylinder pressure ΔPc to be used at step S36 to zero (S40). Accordingly, when the valve overlapping is not set, at step S36 the amount of the intake air Mair aspired into each of the combustion chambers 3 is calculated based only on the in-cylinder pressure Pc(θ2) obtained at step S34. In this regard, the in-cylinder pressure during the compression stroke indicates a relatively high value and can be detected with accuracy regardless of the detection accuracy of the in-cylinder pressure sensor 15 or the resolution of the in-cylinder pressure data. Thus, the use of the in-cylinder pressure in the combustion chamber 3 at a given timing during the compression stroke and before ignition enables the amount of the intake air aspired into the combustion chamber 3 to be accurately obtained.

Even when the valve overlapping is not set, the ECU20, at step S38, determines the correction amount of the fuel fc based on the amount of the intake air $M_{air}$ and the above initial injection amount fi determined at S12 so that the air-fuel ratio of the mixture in the combustion chamber 3 corresponds to the target air-fuel ratio (the theoretical air-fuel ratio) after the process of step S36 is completed. The ECU20 opens the injector 12 disposed in the object combustion chamber 3 so as to inject the correction amount fc of the fuel therefrom at the given timing during the compression stroke after the intake valve Vi has closed (S38).

It should be noted that the internal combustion engine 1 according to this embodiment is described giving an example of a so-called direct-fuel injection engine but it is not intended to limit the present invention to it and it will be appreciated that the present invention may be applied to an intake pipe (an intake port) injection type of internal combustion engine and an internal combustion engine, wherein each of combustion chambers 3 has an injector for port injection and an injector for in-cylinder injection.

If the negative determination is made at S18 in the aforementioned internal combustion engine 1, it is assumed that the ratio between the pressure of the intake air Pm(θ1) and the pressure of the exhaust gas Pe(θ1) during the valve overlapping is fixed to the threshold ε as a guard value, but the present invention is not limited to those executing this process. In other words, as shown in FIG. 4, the correlation between Pm(θ1)/Pc(θ0), which is the ratio between the pressure of the intake air Pm(θ1) and the in-cylinder pressure Pc(θ0) and Pm(θ1)/Pe(θ1), which is the ratio between the pressure of the intake air Pm(θ1) and the pressure of the exhaust gas Pe(θ1) may be approximated using a plurality of functions.

Figure 4:
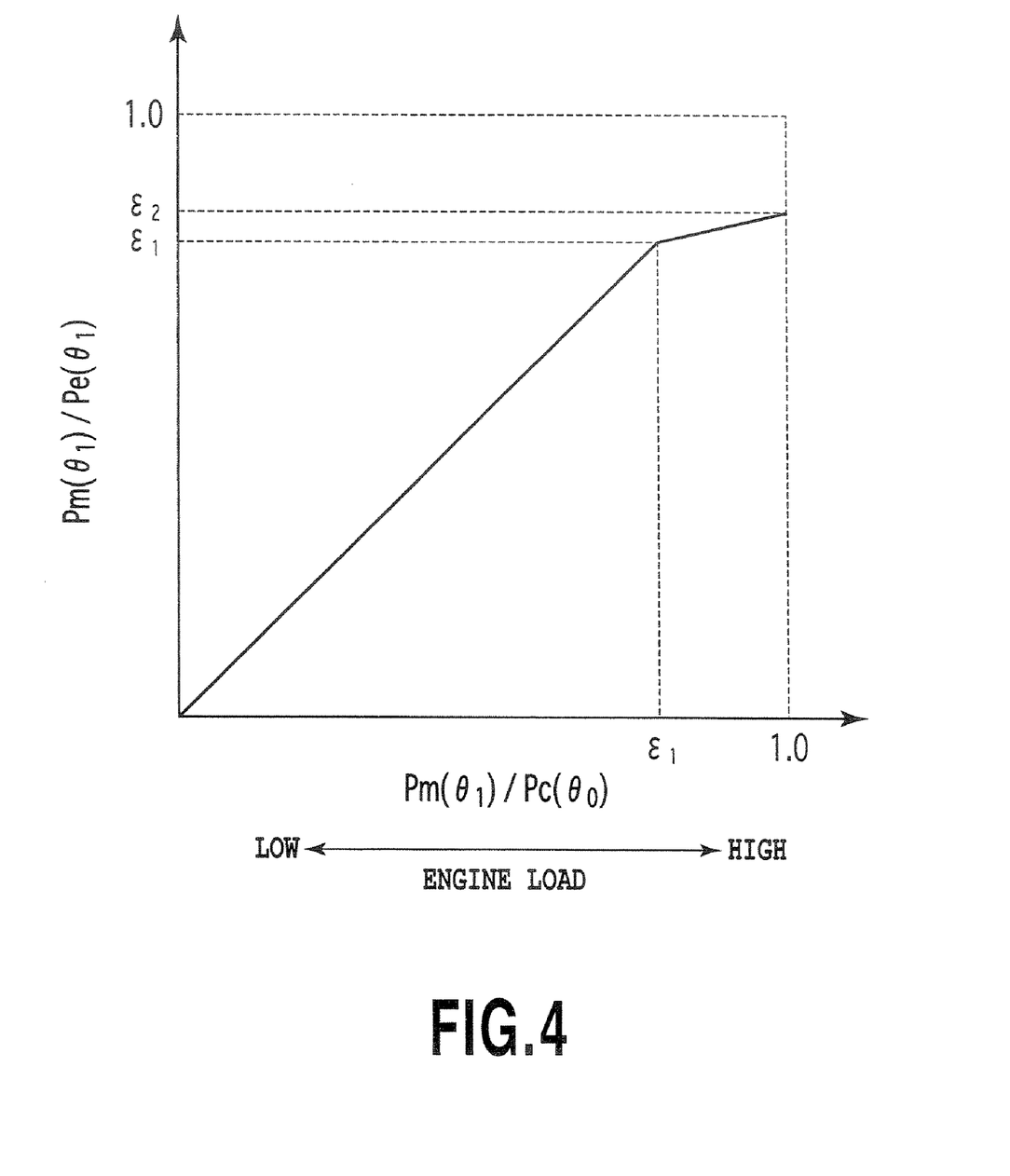
FIG. 4 is a graph exemplifying a relation between a ratio of a pressure of intake air at a given timing during a valve overlap stage to an in-cylinder pressure at a given timing immediately before the valve overlap stage or at start thereof and a ratio of a pressure of intake air to a pressure of an exhaust gas at a given timing during the valve overlap stage.

In the example shown in FIG. 4, the relationship between Pm(θ1)/Pc(θ0) and Pm(θ1)/Pe(θ1) are approximated using two lines and in the range of 0≦Pm(θ1)/Pc(θ1)≦ε1 (note that ε1 is a constant experimentally and empirically determined), Pm(θ1)/Pe(θ1)=Pm(θ1)/Pc(θ0) is established and in the range of ε1≦Pm(θ1)/Pc(θ1)≦1.0, Pm(θ1)/Pe(θ1) is expressed by the following formula (8) (note that in the formula (8), ε2 is a constant experimentally and empirically determined, and ε2>ε1).

If this type of approximation is applied, when the negative determination is made at step S18 as shown in FIG. 2, the value for Pe(θ1) is set according to the following formula (9) at step S22.

$$Pm(\theta_1)/Pe(\theta_1) = \frac{\varepsilon_2 - \varepsilon_1}{1 - \varepsilon_1} \cdot (Pm(\theta_1)/Pc(\theta_0) - \varepsilon_1) + \varepsilon_1 \quad (8)$$

$$Pe(\theta_1) = \frac{Pm(\theta_1)}{\left\{\varepsilon_1 + \frac{\varepsilon_2 - \varepsilon_1}{1 - \varepsilon_1} \cdot \left(\frac{Pm(\theta_1)}{Pc(\theta_0)} - \varepsilon_1\right)\right\}} \quad (9)$$

In the embodiment, the surge tank 8 is provided with the intake pressure sensor 16 for detecting a pressure of the intake air therein, but the intake pressure sensor 16 may be omitted and a pressure of the intake air Pm(θ1) at given timing during the valve overlapping (when the crank angle becomes θ1) may be estimated based on an in-cylinder pressure.

This means that the pressure of the intake air and the in-cylinder pressure are generally equal to each other at the bottom dead center during the intake stroke. The timing when the valve overlapping is performed in one combustion chamber 3 is generally equal to the timing when the intake bottom dead center position comes in another combustion chamber 3 in which the intake stroke is performed by ¼ cycle (180°) earlier than that in the corresponding combustion chamber 3 in the case of a four-cylinder engine. Accordingly, in consideration of these conditions, the pressure of the intake air aspired in one combustion chamber 3 during the valve overlapping can be estimated based on the in-cylinder pressure at the intake bottom dead center for another combustion chamber 3 in which the intake stroke is performed by ¼ cycle earlier than that of the corresponding combustion chamber 3. This eliminates the need for the intake sensor 16 for detecting the pressure of the intake air, allowing the cost necessary for calculating the amount of the intake air aspired into each of the combustion chambers 3 to be further reduced.

Figure 5:
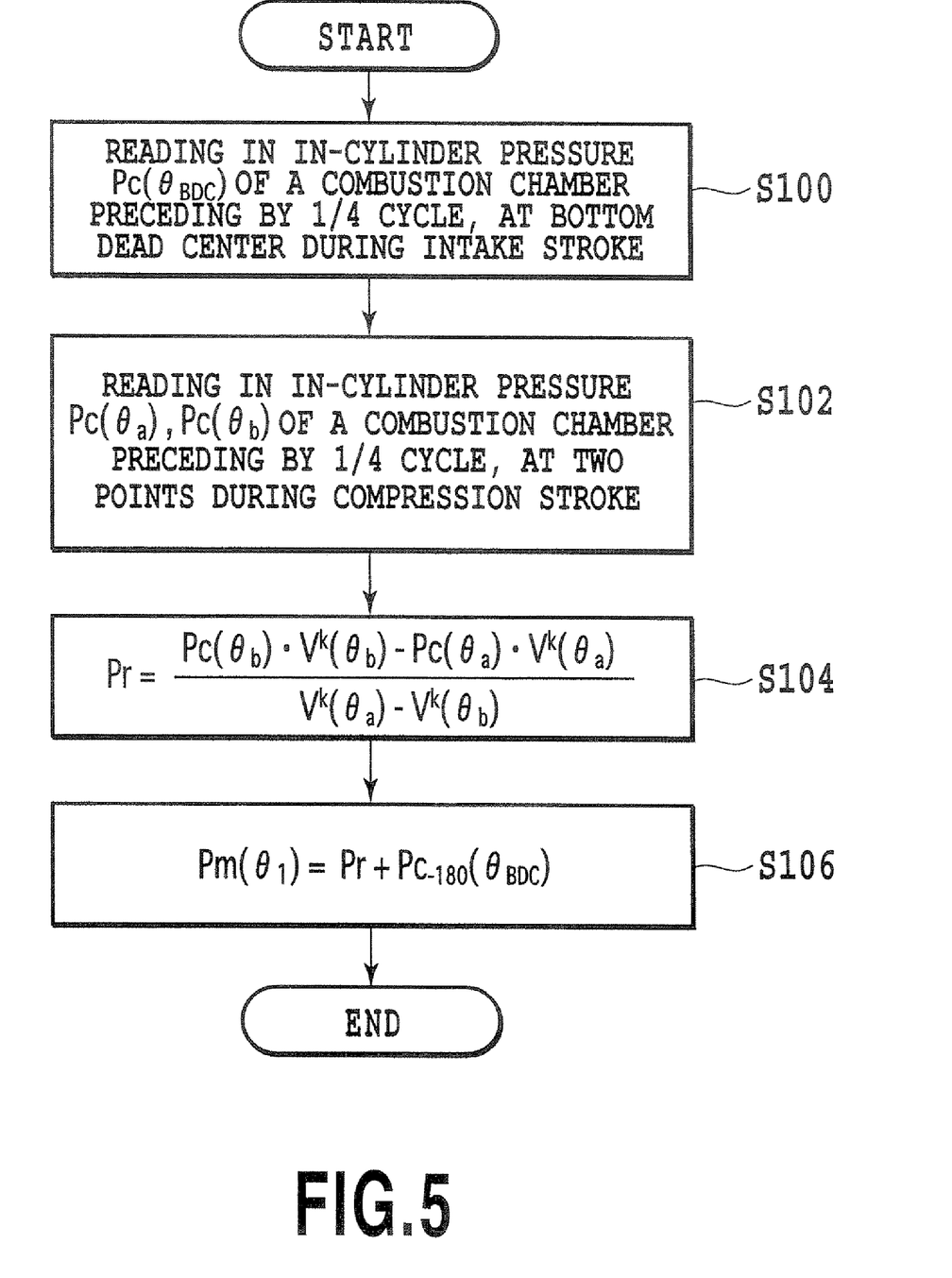
FIG. 5 is a flowchart illustrating a routine for estimating a pressure of intake air at a given timing during the valve overlap stage based on the in-cylinder pressure.

FIG. 5 shows a flow chart illustrating a routine for estimating the pressure of the intake air at a given timing during the valve overlapping based on the in-cylinder pressure. The routine illustrated in FIG. 5 is executed by the ECU20, for example, at a given timing before step S14 of FIG. 2. In this case, the ECU20 reads out the value Pc (θBDC) detected by the in-cylinder pressure sensor 15 at the intake bottom dead center proximal to the combustion chamber 3 (the preceding combustion chamber 3) where the intake stroke is performed by ¼ cycle earlier than that in the object combustion chamber 3 from a given memory region (S100). Moreover, the ECU20 reads out the values Pc(θa), Pc(θb) detected by the in-cylinder pressure sensor 15 at given two points during the compression stroke after the aforementioned bottom dead center position during the intake stroke stage in the combustion chamber 3 where the intake stroke is performed by ¼ cycle earlier than that in the object combustion chamber 3, from the given memory region (S102). It should be noted that the crank angles θa, θb may be any angles if they are selected so as to be included during the compression stroke.

In this regard, since if the intake sensor is omitted, the output (relative pressure) from the in-cylinder pressure sensor 15 can not be corrected into its absolute pressure based on the value detected by the intake pressure sensor 16, the values Pc(θa),Pc(θb) detected by the in-cylinder pressure sensor 15 are stored in the memory region with no correction into their absolute pressures (i.e. as the relative pressures). Assuming that the in-cylinder pressure (true value) after correction into its absolute pressure when the crank angle becomes θa is Pa, the in-cylinder pressure (true value) after correction into its absolute pressure when the crank angle becomes θb is Pb, and the absolute pressure correction value for the in-cylinder pressure sensor 15 is Pr, Pa=Pc(θa)+Pr and Pb=Pc(θb)+Pr are established. Further, assuming that the compression stroke in the internal combustion engine is an adiabatic process and a specific heat ratio is κ, the relationship of Pa·Vκ(θa)=Pb·Vκ(θb) is established, which may be represented by the following formula (10). When the formula 10 is evaluated to obtain the absolute pressure correction value Pr, the absolute pressure correction value Pr is represented by the following formula 11.

$$(Pc(\theta_a) + Pr) \cdot V^\kappa(\theta_a) = (Pc(\theta_b) + Pr) \cdot V^\kappa(\theta_b) \quad (10)$$

$$Pr = \frac{Pc(\theta_b) \cdot V^\kappa(\theta_b) - Pc(\theta_a) \cdot V^\kappa(\theta_a)}{V^\kappa(\theta_a) - V^\kappa(\theta_b)} \quad (11)$$

For this reason, The ECU20, after the process at step S102 is completed, uses the values Pc(θa),Pc(θb) detected by the in-cylinder pressure sensors 15 at a given two points during the compression stroke in the preceding combustion chamber 3 and the in-cylinder volumes V(θa),V(θb) at the given two points to calculate the absolute pressure correction value Pr for the in-cylinder pressure sensor 15 disposed in the preceding combustion chamber 3 from the aforementioned formula (11) (S104). It should be noted that the values for the in-cylinder volumes V(θa),V(θb) used at step S104 are calculated and stored in the memory, and the ECU20 reads out these values for the in-cylinder volumes V(θa),V(θb) from the memory for use at the process of step S20.

After having obtained the absolute pressure correction value Pr at step S104, the ECU20 uses the value Pc(θBDC) detected by the in-cylinder pressure sensor 15 at the bottom dead center during the intake stroke obtained at step S100 and the absolute pressure correction value Pr obtained at step S104 to calculate the pressure of the intake air Pm(θ1) during the valve overlapping in the object combustion chamber 3 (S106). This means that assuming that the in-cylinder pressure at the intake bottom dead center in a combustion chamber 3 where the intake stroke is performed by ¼ cycle (for a N-cylinder engine, 1/N cycle) earlier than that the object combustion chamber 3, is Pc−180(θBDC), the pressure of the intake air Pm(θ1) during the valve overlapping in the object combustion chamber 3 may be calculated from the formula, Pm(θ1)=Pr+Pc−180(θBDC). Thus, since the routine illustrated in FIG. 5 is executed, the amount of the intake air aspired into each of the combustion chambers 3 can be accurately calculated based on the in-cylinder pressure P(θ) and the in-cylinder volume V(θ) (based on a product P(θ)·Vκ(θ) of the in-cylinder pressure P(θ) and a value Vκ(θ) made by the in-cylinder volume V(θ) raised to a specific heat ratio (given index number) κ, without using an intake pressure sensor for detecting a pressure of the intake air.

INDUSTRIAL APPLICABILITY

The present invention may be applied for accurately obtaining a required amount of fuel so as to approximate an air-fuel ratio in a combustion chamber to its target value.

The invention claimed is:

1. A control device of an internal combustion engine having an injector that supplies fuel into a combustion chamber and a valve-actuating mechanism capable of changing an opening characteristic of at least one of an intake valve and an exhaust valve, and that generates power by burning a mixture of fuel and air in the combustion chamber, comprising:
an intake pressure detection device that detects intake air pressure upstream of the combustion chamber;
an in-cylinder pressure detection device that detects in-cylinder pressure in the combustion chamber;
a controller that
estimates an anticipated amount of air that will be aspired into the combustion chamber in response to a demand for the internal combustion engine;
calculates an amount of air aspired into the combustion chamber based on a first in-cylinder pressure detected by the in-cylinder pressure detection device at a first timing that occurs during a compression stroke and before combustion starts in the combustion chamber, an intake air pressure detected by the intake pressure detection device at a second timing that occurs during a period of time when opening periods of the intake and exhaust valves overlap, and a pressure of exhaust gas during the period of time when opening periods of the intake and exhaust valves overlap, wherein the controller estimates the pressure of the exhaust gas during the period of time when opening periods of the intake and exhaust valves overlap based on a second in-cylinder pressure detected by the in-cylinder pressure detection device at a third timing that occurs before or at a start of the period of time when opening periods of the intake and exhaust valves overlap; and causes the injector to inject an initial amount of fuel determined so that a first air-fuel ratio of a first mixture in the combustion chamber is higher than a target value in accordance with the anticipated amount of air estimated by the controller, and causes the injector to inject a correction amount of fuel determined based on the initial amount of fuel and the amount of air aspired into the combustion chamber calculated by the controller so that a second air-fuel ratio of a second mixture in the combustion chamber corresponds to the target value.

2. A control device for internal combustion engine according to claim 1, wherein:
the injector comprises an injector for in-cylinder injection that injects fuel directly into the combustion chamber;
the initial amount of fuel is greater than the correction amount of fuel;
the initial amount of fuel is injected into the combustion chamber by the injector during an intake stroke; and
the correction amount of fuel is injected into the combustion chamber by the injector during a compression stroke.

3. A control device for internal combustion engine according to claim 1, wherein:
the controller calculates the amount of air aspired into the combustion chamber based on the first in-cylinder pressure detected by the in-cylinder pressure detection device at the first timing during the compression stroke and before combustion starts in the combustion chamber, the intake air pressure detected by the intake pressure detection device at the second timing that occurs during the period of time when opening periods of the intake and exhaust valves overlap, the pressure of exhaust gas during the period of time when opening periods of the intake and exhaust valves overlap, and lift amounts of the intake and exhaust valves.

4. A control device for internal combustion engine according to claim 1, wherein:
the internal combustion engine comprises a plurality of combustion chambers, each of which is provided with an in-cylinder pressure detection device; and
the controller calculates the amount of air aspired into each of the combustion chambers based on the first in-cylinder pressure in the respective combustion chamber detected by the respective in-cylinder pressure detection device, the intake air pressure detected by the respective intake pressure detection device during the period of time when opening periods of the intake and exhaust valves overlap, and the pressure of exhaust gas during the period of time when opening periods of the intake and exhaust valves overlap.

5. A control device for internal combustion engine according to claim 1, wherein:
the internal combustion engine comprises a plurality of the combustion chambers that each include the in-cylinder pressure detection device; and
the intake air pressure in any of the combustion chambers during the period of time when opening periods of the intake and exhaust valves overlap is estimated based on an in-cylinder pressure at an intake bottom dead center in another combustion chamber in which the intake stroke is performed earlier.

6. A control device of an internal combustion engine having an injector that supplies fuel into a combustion chamber and a valve-actuating mechanism capable of changing an opening characteristic of at least one of an intake valve and an exhaust valve, and that generates power by burning a mixture of fuel and air in the combustion chamber, comprising:

an intake pressure detection device that detects intake air pressure upstream of the combustion chamber;
an in-cylinder pressure detection device that detects in-cylinder pressure in the combustion chamber;
a controller that
estimates an anticipated amount of air that will be aspired into the combustion chamber in response to a demand for the internal combustion engine;
calculates an amount of air aspired into the combustion chamber based on a first in-cylinder pressure detected by the in-cylinder pressure detection device at a first timing that occurs during a compression stroke and before combustion starts in the combustion chamber, an intake air pressure detected by the intake pressure detection device at a second timing that occurs during a period of time when opening periods of the intake and exhaust valves overlap, and a pressure of exhaust gas during the period of time when opening periods of the intake and exhaust valves overlap, wherein, until a ratio between intake pressure detected by the intake pressure detection device during the period of time when opening periods of the intake and exhaust valves overlap and a second in-cylinder pressure detected by the in-cylinder pressure detection device at a third timing that occurs before or at a start of the period of time when opening periods of the intake and exhaust valves overlap exceeds a given value, the controller estimates the pressure of the exhaust gas during the period of time when opening periods of the intake and exhaust valves overlap based on the second in-cylinder pressure, and wherein, when the ratio between intake pressure detected by the intake pressure detection device during the period of time when opening periods of the intake and exhaust valves overlap and the second in-cylinder pressure exceeds the given value, the controller estimates the pressure of the exhaust gas during the period of time when opening periods of the intake and exhaust valves overlap based on the intake air pressure detected by the intake pressure detection device at the second timing and the given value; and
causes the injector to inject an initial amount of fuel determined so that a first air-fuel ratio of a first mixture in the combustion chamber is higher than a target value in accordance with the anticipated amount of air estimated by the controller, and causes the injector to inject a correction amount of fuel determined based on the initial amount of fuel and the amount of air aspired into the combustion chamber calculated by the controller so that a second air-fuel ratio of a second mixture in the combustion chamber corresponds to the target value.

7. A control device for internal combustion engine according to claim 6, wherein:
the injector comprises an injector for in-cylinder injection that injects fuel directly into the combustion chamber;
the initial amount of fuel is greater than the correction amount of fuel;
the initial amount of fuel is injected into the combustion chamber by the injector during an intake stroke; and
the correction amount of fuel is injected into the combustion chamber by the injector during a compression stroke.

8. A control device for internal combustion engine according to claim 6, wherein:
the controller calculates the amount of air aspired into the combustion chamber based on the first in-cylinder pressure detected by the in-cylinder pressure detection device at the first timing during the compression stroke and before combustion starts in the combustion chamber, the intake air pressure detected by the intake pressure detection device at the second timing that occurs during the period of time when opening periods of the intake and exhaust valves overlap, the pressure of exhaust gas during the period of time when opening periods of the intake and exhaust valves overlap, and lift amounts of the intake and exhaust valves.

9. A control device for internal combustion engine according to claim 6, wherein:
the internal combustion engine comprises a plurality of combustion chambers, each of which is provided with an in-cylinder pressure detection device; and
the controller calculates the amount of air aspired into each of the combustion chambers based on the first in-cylinder pressure in the respective combustion chamber detected by the respective in-cylinder pressure detection device, the intake air pressure detected by the respective intake pressure detection device during the period of time when opening periods of the intake and exhaust valves overlap, and the pressure of exhaust gas during the period of time when opening periods of the intake and exhaust valves overlap.

10. A control device for internal combustion engine according to claim 6, wherein:
the internal combustion engine comprises a plurality of the combustion chambers that each include the in-cylinder pressure detection device; and
the intake air pressure in any of the combustion chambers during the period of time when opening periods of the intake and exhaust valves overlap is estimated based on an in-cylinder pressure at an intake bottom dead center in another combustion chamber in which the intake stroke is performed earlier.

11. A control method of an internal combustion engine having an injector that supplies fuel into a combustion chamber and a valve-actuating mechanism capable of changing an opening characteristic of at least one of an intake valve and an exhaust valve, and that generates power by burning a mixture of fuel and air in the combustion chamber, comprising:
(a) estimating an anticipated amount of air that will be aspired into the combustion chamber in response to a demand for the internal combustion engine;
(b) causing the injector to inject an initial amount of fuel determined so that a first air-fuel ratio of the mixture in the combustion chamber is higher than a target value in accordance with the anticipated air amount;
(c) calculating an amount of air aspired into the combustion chamber based on a first in-cylinder pressure in the combustion chamber at a first timing that occurs during a compression stroke and before combustion starts in the combustion chamber, an intake air pressure at a second timing that occurs during a period of time when opening periods of the intake and exhaust valves overlap, and a pressure of exhaust gas during the period of time when opening periods of the intake and exhaust valves overlap, wherein the pressure of exhaust gas during the period of time when opening periods of the intake and exhaust valves overlap is estimated based on a second in-cylinder pressure detected at a third timing that occurs before or at start of the valve overlapping; and
(d) causing the injector to inject a correction amount of fuel determined based on the initial amount of fuel and the calculated amount of air aspired into the combustion chamber so that a second air-fuel ratio of the mixture in the combustion chamber corresponds to the target value.

12. A control method of an internal combustion engine having an injector that supplies fuel into a combustion chamber and a valve-actuating mechanism capable of changing an opening characteristic of at least one of an intake valve and an exhaust valve, and that generates power by burning a mixture of fuel and air in the combustion chamber, comprising:
(a) estimating an anticipated amount of air that will be aspired into the combustion chamber in response to a demand for the internal combustion engine;
(b) causing the injector to inject an initial amount of fuel determined so that a first air-fuel ratio of the mixture in the combustion chamber is higher than a target value in accordance with the anticipated air amount;
(c) calculating an amount of air aspired into the combustion chamber based on a first in-cylinder pressure in the combustion chamber at a first timing that occurs during a compression stroke and before combustion starts in the combustion chamber, an intake air pressure at a second timing that occurs during a period of time when opening periods of the intake and exhaust valves overlap, and a pressure of exhaust gas during the period of time when opening periods of the intake and exhaust valves overlap, wherein, until a ratio between intake pressure detected by the intake pressure detection device during the period of time when opening periods of the intake and exhaust valves overlap and a second in-cylinder pressure detected by the in-cylinder pressure detection device at a third timing that occurs before or at a start of the period of time when opening periods of the intake and exhaust valves overlap exceeds a given value, the pressure of the exhaust gas during the period of time when opening periods of the intake and exhaust valves overlap is estimated based on the second in-cylinder pressure, and wherein, when the ratio between intake pressure detected by the intake pressure detection device during the period of time when opening periods of the intake and exhaust valves overlap and the second in-cylinder pressure exceeds the given value, the pressure of the exhaust gas during the period of time when opening periods of the intake and exhaust valves overlap is estimated based on the intake air pressure detected by the intake pressure detection device at the second timing and the given value; and
(d) causing the injector to inject a correction amount of fuel determined based on the initial amount of fuel and the calculated amount of air aspired into the combustion chamber so that a second air-fuel ratio of the mixture in the combustion chamber corresponds to the target value.

* * * * *